(12) United States Patent
Chou et al.

(10) Patent No.: US 7,183,692 B2
(45) Date of Patent: Feb. 27, 2007

(54) METHOD FOR CONTROLLING POWER SUPPLY IN A BUFFERED MODULATION MODE

(75) Inventors: Chin-Wen Chou, Hsin-Tien (TW); Ying-Nan Cheng, Hsin-Tien (TW)

(73) Assignee: Zippy Technology Corp., Taipei Hsien (TW)

( * ) Notice: Subject to any disclaimer, the term of this patent is extended or adjusted under 35 U.S.C. 154(b) by 11 days.

(21) Appl. No.: 11/009,077

(22) Filed: Dec. 13, 2004

(65) Prior Publication Data

US 2006/0126365 A1 Jun. 15, 2006

(51) Int. Cl.
*H01L 41/00* (2006.01)
(52) U.S. Cl. .................. 310/318; 310/316.01; 315/291
(58) Field of Classification Search ................. 315/307, 315/219, 291, 224, 169.3; 310/318, 355, 310/314, 319; 363/16–20, 97, 75, 49, 131
See application file for complete search history.

(56) References Cited

U.S. PATENT DOCUMENTS

| 5,812,383 A | * | 9/1998 | Majid et al. ............. 363/21.05 |
| 5,923,542 A | * | 7/1999 | Sasaki et al. ................. 363/16 |
| 6,864,644 B2 | * | 3/2005 | Kernahan .................... 315/307 |

\* cited by examiner

*Primary Examiner*—Rajnikant B. Patel
(74) *Attorney, Agent, or Firm*—Birch, Stewart, Kolasch & Birch, LLP

(57) ABSTRACT

A method for controlling power supply in a buffered modulation mode is to control an inverter to perform energy transformation so that the inverter and a load in the rear end can function in a reliable characteristic range and prevent the load from aging too quickly. The method includes entering a total energy control regulation signal to an input end of an energy/time ratio synthesizing control unit to get an ON_OFF (High-Low) control sequence on output ends thereof, and adding a regulation energy of varying amplitudes during the ON-Time in the burst period of two ON_OFF cycles to prevent the excitation dynamical ratio of the inverter from being excessively large thereby to prevent the load from aging too quickly.

6 Claims, 4 Drawing Sheets

METHOD FOR CONTROLLING POWER SUPPLY IN A BUFFERED MODULATION MODE

FIELD OF THE INVENTION

The present invention relates to a method for controlling power supply and particularly to a power supply control method that controls a regulation energy through a buffered modulation mode thereby to control an inverter to perform power supply transformation to prevent the inverter from having an excessive excitation dynamical ratio to improve the problem of rapid aging of loads.

BACKGROUND OF THE INVENTION

The conventional control method for power supply or energy regulation, such as dimming control, generally adopts time cycle with an ON-OFF interval to regulate ON-OFF cycle ratio to get different output energy (referring to FIG. 1). The excitation dynamical ratio (EDR) obtained by means of such an approach may be defined by equation-1 depicted below:

$$\approx \frac{E_1(\text{ON-Energy cycle})}{E_2(\text{OFF-Energy cycle})}, \quad \text{(equation-1)}$$

The conventional EDR is
$$\frac{E_1}{E2 \approx 0} \Rightarrow \infty$$

Based on equation-1, the conventional EDR is infinite. Its meaning is similar to bending a steel wire to 90 degrees and straightening again. If the process is repeated many times, the steel wire will be ruptured. If the steel wire is bent only 10 degrees, it can be bent many more times than by bending 90 degrees before ruptured. The conventional energy control method set forth above has a great impact to the life span of the load. When the EDR is excessively large, the load has to function in two extreme conditions, and aging of the load is accelerated.

Another conventional method to control energy regulation (referring to FIGS. 2, 3 and 4) adopts individual EDR as follow:
$$\frac{E_A}{E_A} = 1,$$

(Referring to FIG. 2)

Total energy $$\frac{EA \times 1(T_{TOTAL})}{T_{TOTAL}}$$

(Maximum energy output)

EDR:

$$\frac{\frac{1}{2}E_A}{\frac{1}{2}E_A} = 1$$

(Half energy output),(Referring to FIG. 3)

$$\frac{1}{2}\text{Total energy} = \frac{\frac{1}{2}EA \times 1}{T_{TOTAL}}$$

EDR:

$$\frac{\frac{1}{10}E_A}{\frac{1}{10}E_A} = 1,$$

(Referring to FIG. 4)

$$\frac{1}{10}\text{Total energy}\frac{\frac{1}{10}E_A \times 1}{T_{TOTAL}}\left(\frac{1}{10}\text{energy output}\right)$$

The method depicted above also has problems. When total regulation energy changes, the maximum wave amplitude of excitation energy decreases. It could happen that the load cannot be actuated to function at one half of the amplitude energy $$\left(\frac{1}{2}EA\right)$$

(such as the lamp cannot be ignited because of the voltage is too low, or some electromechanical elements cannot be activated because of the peak actuation energy is not adequate).

SUMMARY OF THE INVENTION

The primary object of the present invention is to solve the aforesaid disadvantages. The invention provides a method that adds a regulation energy of varying amplitudes during ON-Time to control energy transformation of an inverter to prevent the EDR from being excessively large so that the inverter and the load can be effectively controlled and the problem of rapid aging of the load may be improved.

To achieve the foregoing object, the method for controlling power supply in a buffered modulation mode according to the invention inputs a total energy control regulation signal on an input end of an energy/time ratio synthesizing control unit to get an ON_OFF (High_Low) control sequence on an output end thereof. And before and after the ON-Time of the burst period of the two ON_OFF cycles, a regulation energy of varying amplitudes is added to achieve the object set forth above.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
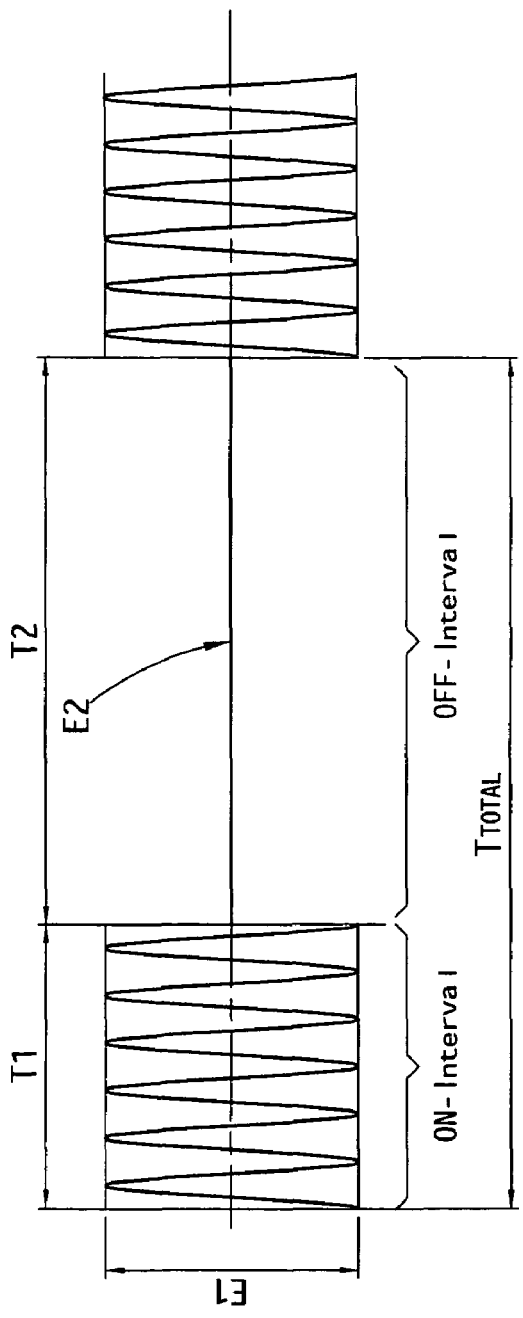
FIGS. 1 through 4 are schematic views of the sequence of control waveforms of a conventional power supply control method.
Figure 2:
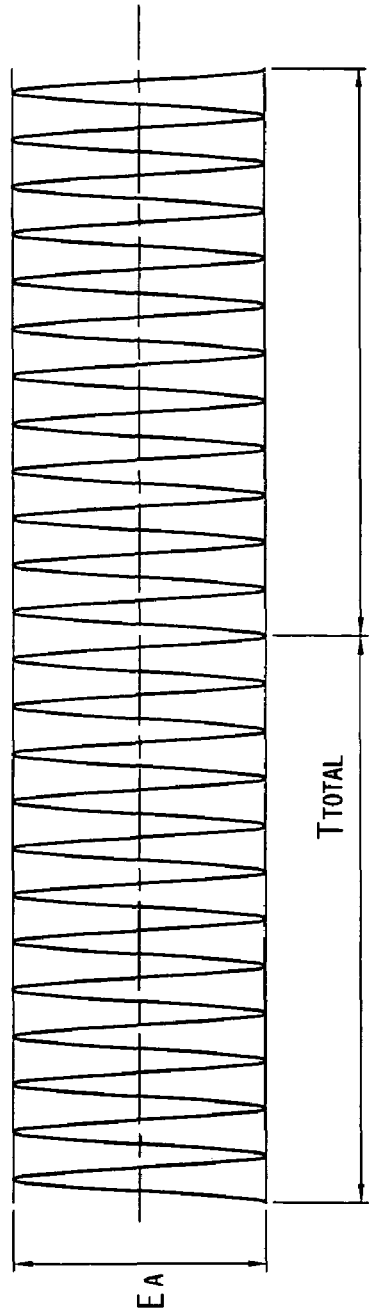
Figure 3:
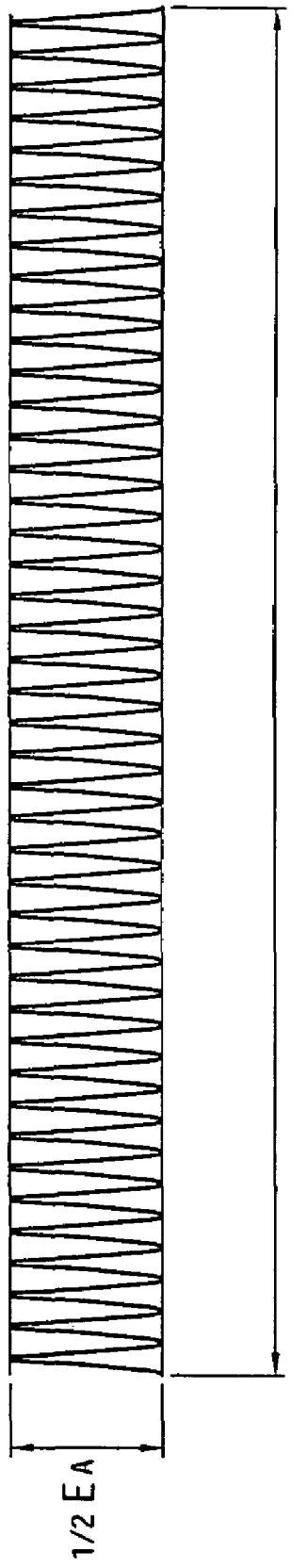
Figure 4:
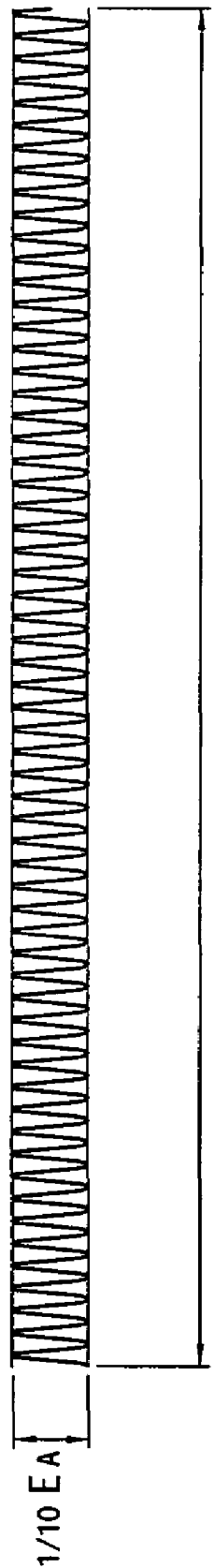
Figure 5:
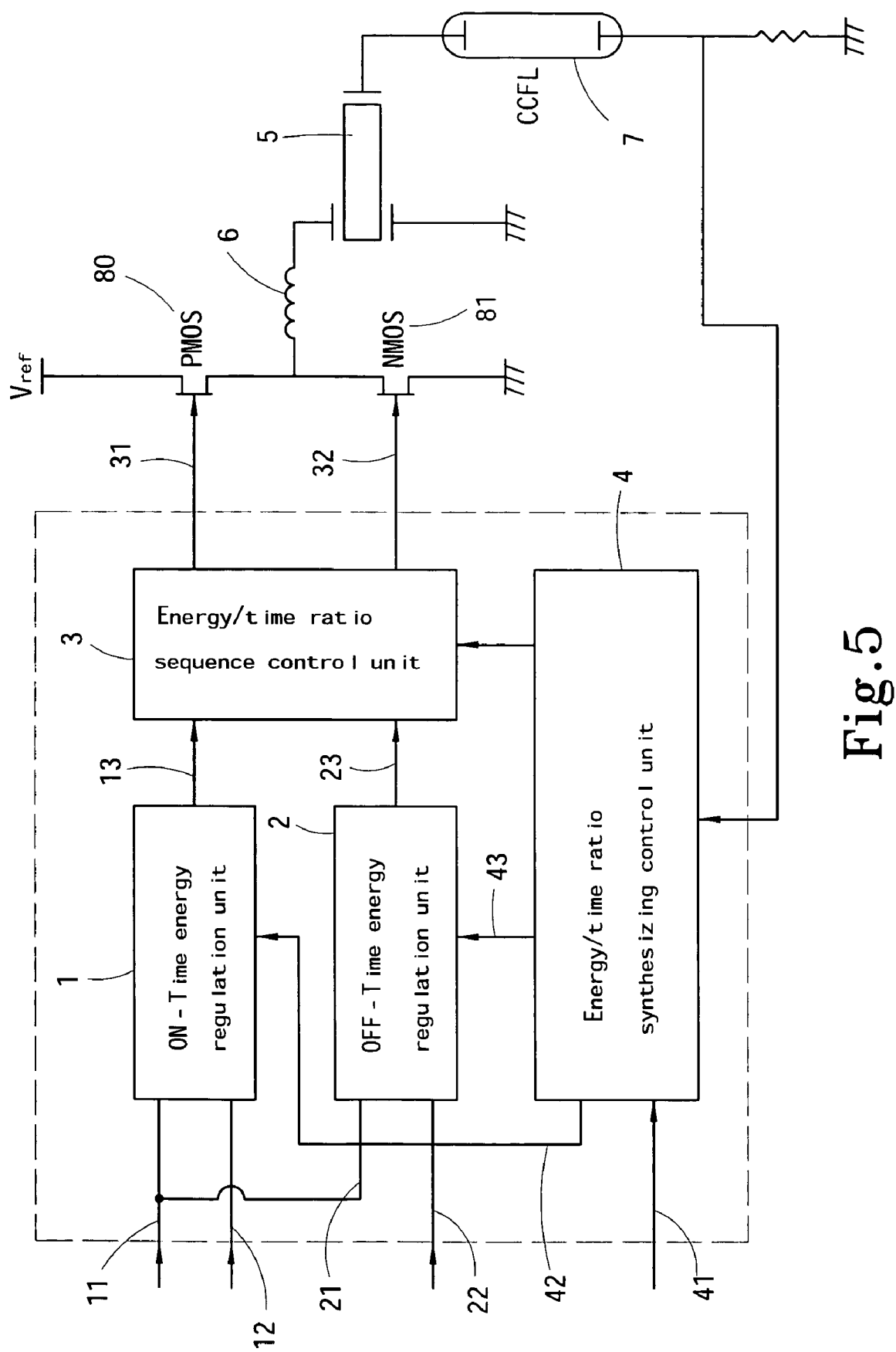
FIG. 5 is a functional block diagram of the control apparatus according to the method of the invention.

Please referring to FIG. 5, the method for controlling power supply in a buffered modulation mode according to the invention aims to add a regulation energy of varying amplitudes in the ON-Time of the burst period of two ON_OFF cycles to get a new excitation dynamical ratio (EDR).

In the conventional power supply control that adopts the ON_OFF interval of time cycle to regulate different ON_OFF cycle length and get different output energy, the life span of the load end elements is adversely affected. The EDR is excessively large. As a result, the load has to operate in two extreme conditions, and aging of the load accelerates.

The invention, by adding a regulation energy of different amplitudes before and after the ON-Time in the burst period of two cycles ($T_{TOTAL}$), a new EDR may be obtained.

To implement the method of the invention, the apparatus being used include: an ON-Time energy regulation unit 1, an OFF-Time energy regulation unit 2, an energy/time ratio sequence control unit 3, and an energy/time ratio synthesizing control unit 4.

The ON-Time energy regulation unit 1 has two input ends 11 and 12. The input end 11 receives a reference signal of a set duty frequency point. Another input end 12 receives a feedback error signal to adjust the duty width. The ON-Time energy regulation unit 1 has an output end 13 to output a regulated signal to the energy/time ratio sequence control unit 3.

The OFF-Time energy regulation unit 2 also has two input ends 21 and 22. The input end 21 receives the same reference signal of the ON-Time energy regulation unit 1. Another input end 22 receives an error signal potential to change the time relationship of reference sequence signals. It has an output end 23 to generate another set of control sequence and output to the energy/time ratio sequence control unit 3.

Figure 6:
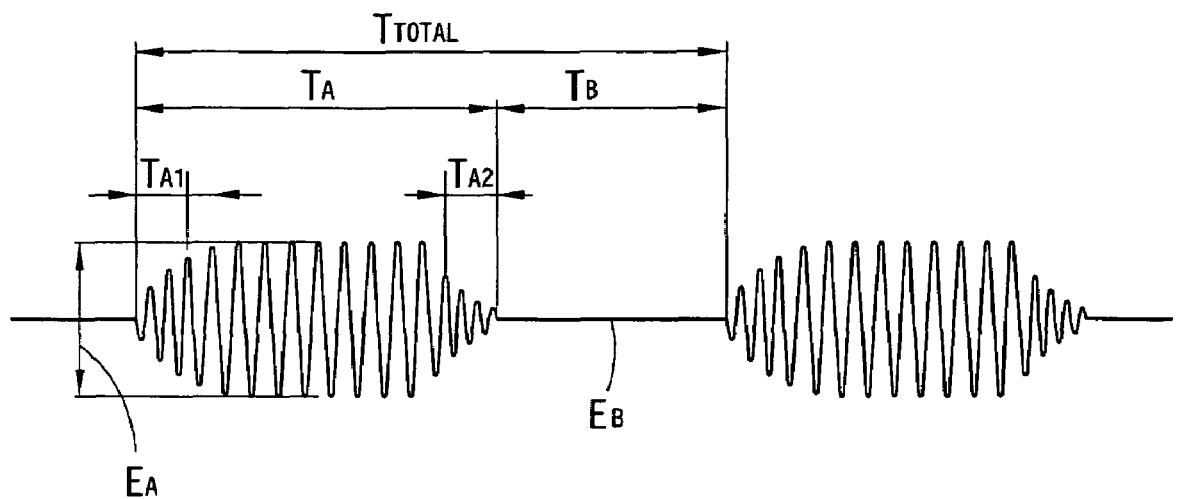
FIG. 6 is a schematic view of a first embodiment of an ON_OFF (High_Low) control sequence waveform of the present invention.

The energy/time ratio synthesizing control unit 4 has an input end 41 to receive a total energy control regulation signal (such as alter from 10% to 100%) and to generate an ON_OFF (High_Low) control sequence TA/TB on output ends 42 and 43 (referring to FIG. 6, where $T_{TOTAL}$ is the burst period between two time intervals). The sequences $T_A/T_B$ are sent respectively to the ON-Time energy regulation unit 1 and the OFF-Time energy regulation unit 2, and output to the energy/time ratio sequence control unit 3. The energy/time ratio sequence control unit 3 has an output end 31 to output a basic phase control signal (different energy total or control signals generated according to the invention) and another output end 32 to output a complementary phase control signal which complements the basic phase control signal, thereby to control an external soft resonant component 6 to perform desired energy waveform transformation. Then send the energy waveform (proximate to a sinusoid wave) to a power transfer element 5. The transformed signal (voltage boosting or lowering signal) is sent to a load 7 (such as lamp, rectification circuit, or the like).

To change the output energy amplitude, the duty width is changed without changing the frequency. As the frequency remains the same, the power transfer element 5 that equips with bandpass characteristics can operate on the maximum efficiency point. Since the duty width is changed, after having output through a soft switching component such as PMOS 80, NMOS 81(MOS), and a voltage wave of smaller amplitude may be obtained. Hence the voltage at the load end is changed and a regulation controlling function is accomplished.

Moreover, during regulating the intensity, the maximum energy amplitude ($E_A$) is still maintained during the ON-Time and controlled by the ON-Time energy regulation unit 1. But the energy amplitude ($E_B$) during the OFF-Time is controlled by the OFF-Time energy regulation unit 2, and an average energy during the OFF-Time is added to the regulation input end to regulate the width of another cycle in the OFF-Time. The basic energy amplitude of this width is much smaller than that in the ON-Time. However, on average, an intensity control effect still can be achieved without any intermittent interruption.

As the energy delivered to the load 7 is same, dimming control function may be achieved. But the EDR is much smaller than the original infinite. Hence the problem of rapid aging of the load is greatly improved.

In addition, the invention can maintain the original peak dynamic energy and regulate total energy at the same time. Thus the energy regulation dynamic range may be expanded without damaging the life span of the load 7 (whereas, the control signal in $T_A/T_B$ may be constant frequency, width modulation or frequency modulation, constant width, or modulation of both).

Refer to FIG. 6 for an embodiment of an ON_OFF (High_Low) control sequence waveform of the present invention. Through the apparatus shown in FIG. 5, a regulation energy ($T_{A1}$, $T_{A2}$) of varying amplitudes is added before and after the ON-Time in the burst period of the two ON_OFF cycles. The $T_{TOTAL}$ shown in the drawing represents the burst period.

As shown in FIG. 6, the regulation energy $T_{A1}$ is a control signal in a rising buffer interface control period, while the regulation energy $T_{B1}$ is a control signal in a lowering buffer interface control period. $T_{A1}/T_{B1}$ form a buffered waveform alteration which may be in different modes such as constant frequency, frequency modulation, constant width or altering width. The main function is to improve the transition period of $E_A/E_B$ to prevent $E_A/E_B$ EDR from being too large.

$$\text{Total energy} = \frac{E_A \times (T_A - T_{A1} - t_{A2}) + E_{(A1)} \times T_{A1} + E_B \times T_B + E_{(A2)} \times T_{A2}}{T_{TOTAL}}$$

(where $T_A/T_B$ is the time ratio for energy rationing).

Figure 7:
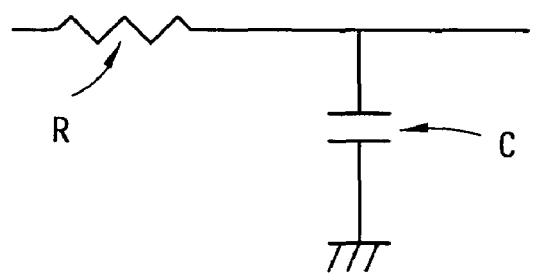
FIG. 7 is an embodiment of a circuit diagram to generate the control sequence waveform shown in FIG. 6.

The regulation energy $T_A$ and $T_B$ depicted above may also be generated through a buffer control circuit (such as a RC charge and discharge circuit, referring to FIG. 7). Through the RC charge and discharge circuit, as shown in FIG. 6, on the rising edge of the regulation energy $T_{A1}$ and the lowering edge of the regulation energy $T_{B1}$, a curved buffer waveform is obtained. Thus an improved buffering effect may be achieved. The rising curve of the regulation energy $T_{A1}$ in FIG. 6 is a curve with a decreasing gradient, while the lowering curve of the regulation energy $T_{A2}$ is a curve with an increasing gradient While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method for controlling power supply in a buffered modulation mode to control an inverter to perform energy transformation, comprising:

generating an ON_OFF(High_Low) control sequence having an ON Time $T_A$ and an OFF Time $T_B$ in a cycle; and adding a regulation energy of varying amplitudes during a transition of the ON-Time in a burst period of two ON_OFF cycles to prevent a an excitation dynamical ratio (EDR) of the inverter from being excessively large to allow the inverter and a load on a rear end to operate within a reliable characteristic range.

2. The method of claim 1, wherein the control sequence is generated by an energy/time ratio synthesizing control unit according to a total energy control regulation signal input to an input end thereof.

3. The method of claim 2, wherein the total energy control regulation signal has a selected width range ratio which ranges from 10% to 100%.

4. The method of claim 1, wherein the regulation energy of varying amplitudes is added respectively to a front end and a rear end of the ON-Time in the burst period of the two ON_OFF cycles.

5. The method of claim 4, wherein one regulation energy $T_{A1}$ is a control signal in a rising buffer interface control period, and another regulation energy $T_{A2}$ is a control signal in a lowering buffer interface control period, and the combination of $T_{A1}$ and $T_{B1}$ forms a buffered waveform alteration which is selectively a constant frequency, a frequency modulation, a constant width or a varying width to improve the transition period and prevent the EDR of the inverter from being too large.

6. The method of claim 5, wherein the rising curve of the regulation energy $T_{A1}$ is a curve of a decreasing gradient, and the lowering curve of the regulation energy $T_{A2}$ a curve of an increasing gradient.

* * * * *